(12) United States Patent
Piontek

(10) Patent No.: US 7,905,728 B2
(45) Date of Patent: Mar. 15, 2011

(54) DEVICE AND METHOD FOR GENERATING VORTEX

(75) Inventor: Robert P. Piontek, Aurora, IL (US)

(73) Assignee: Twister Tube, Ltd., Naperville, IL (US)

( * ) Notice: Subject to any disclaimer, the term of this patent is extended or adjusted under 35 U.S.C. 154(b) by 623 days.

(21) Appl. No.: 11/867,860

(22) Filed: Oct. 5, 2007

(65) Prior Publication Data

US 2009/0093318 A1 Apr. 9, 2009

(51) Int. Cl.
*G09B 23/00* (2006.01)
(52) U.S. Cl. ......... 434/276; 434/126; 434/283; 434/370; 434/393; 366/273; 366/274
(58) Field of Classification Search ............ 434/126, 434/186, 217, 276, 283, 300, 302, 370, 393, 434/401; 366/273, 274
See application file for complete search history.

(56) References Cited

U.S. PATENT DOCUMENTS

| | | | | | |
|---|---|---|---|---|---|
| 2,562,714 | A | * | 7/1951 | Hawtof | 416/3 |
| 2,844,363 | A | * | 7/1958 | Clark | 416/3 |
| 3,589,044 | A | * | 6/1971 | Morrison et al. | 40/407 |
| 4,258,912 | A | * | 3/1981 | Reighart, II | 472/65 |
| 5,272,604 | A | * | 12/1993 | Lin | 362/96 |
| 5,416,994 | A | * | 5/1995 | McLaughlin | 40/406 |
| 5,586,823 | A | * | 12/1996 | Carr | 366/274 |
| 6,095,677 | A | * | 8/2000 | Karkos et al. | 366/274 |
| 6,135,604 | A | * | 10/2000 | Lin | 362/101 |
| 6,241,359 | B1 | * | 6/2001 | Lin | 362/96 |
| 6,295,749 | B1 | * | 10/2001 | Lin | 40/406 |
| 6,517,231 | B1 | * | 2/2003 | Biardeau et al. | 366/273 |
| 6,681,508 | B2 | * | 1/2004 | Unger et al. | 40/406 |
| 6,746,131 | B1 | * | 6/2004 | Goldstein et al. | 362/96 |

OTHER PUBLICATIONS

Tiny Tornado (Hand Held) Science Toy advertisement; storeforknowledge.com/Tiny-Tornoda-Hand-Held-Science-Toy-P3606C197.aspx.
Pet Tornado; http://www.;physlink.com/estore/cart/PetTornado.cfm.
Pet Tornado; http://www.fatbraintoys.com/toy_companies/tedco/pet_tordano.cfm.
Tornado Tube; http:www.fatbraintoys.com/images/products/large/TC006.jpg.
Gizmodo—The Gadgets Weblog; Whirlpool Lamp Goodness; http://www.uk.gizmodo.com/2006/01/16/whirlpool_lamp_goodness.html.
RED5; Mini Vortex; http://www.red5.co.uk/Mini-Votex-pr-135.html.
Hurricane in a Bottle at Steve Spangler Science; http://www.stevespanglerscience.com/experiment/00000122.
Family Fun Projects; Making a Soda Bottle tornado Tube; http://www.familyfunprojects.com/tornado.html.
Tornado Science Project; http:www.cool-science-projects.com/tornado-science-project.html.

\* cited by examiner

*Primary Examiner* — Gene Kim
*Assistant Examiner* — Joseph B Baldori
(74) *Attorney, Agent, or Firm* — Kinne IP Group; Charles C Kinne

(57) ABSTRACT

A device and method for generating a visible vortex for display or educational purposes. A container houses a two-phase fluidic system of a primary fluid, such as water, and a secondary fluid such as silicone fluid carrying a powder which has no affinity for the primary fluid. The two-phase fluidic system may be stirred using a stir bar or pump to generate the vortex.

2 Claims, 2 Drawing Sheets

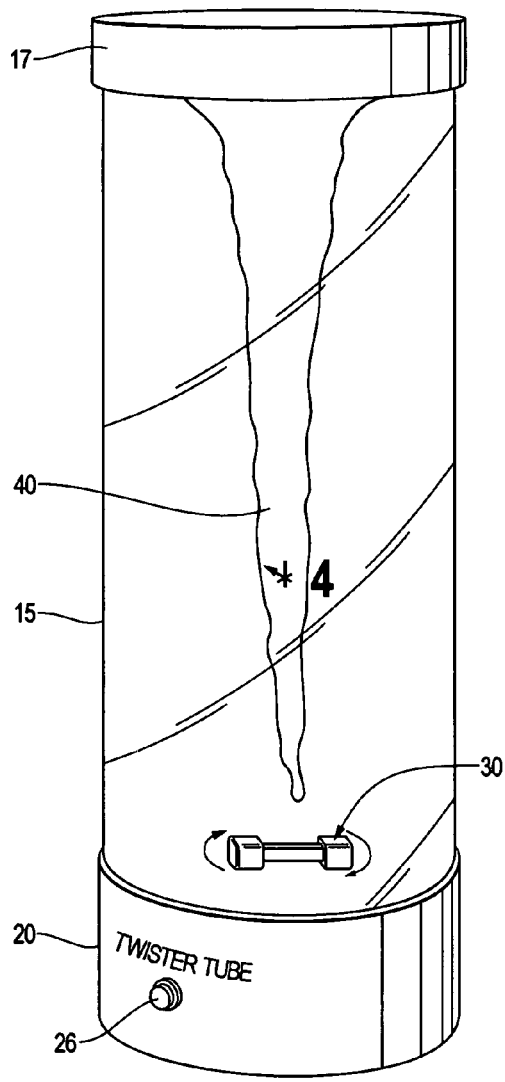
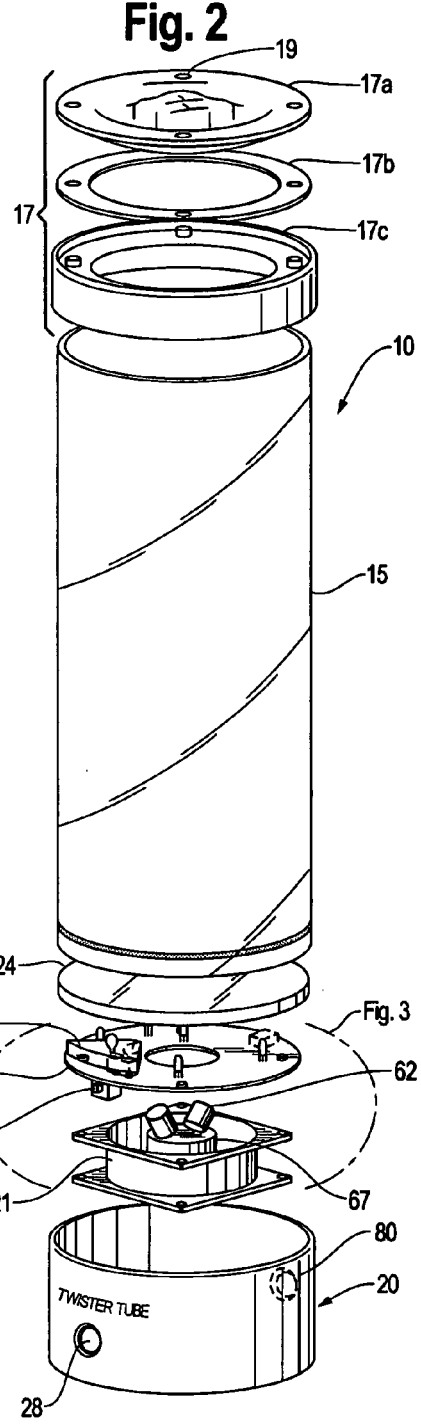
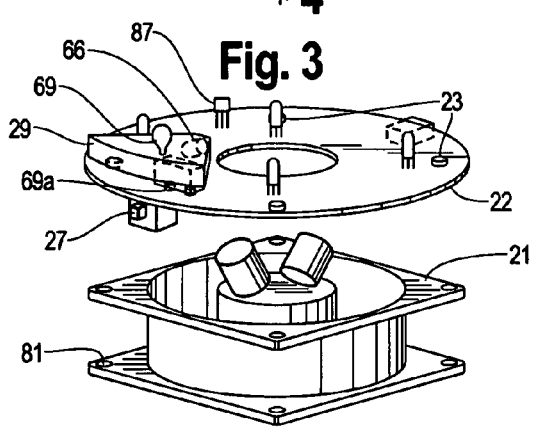

DEVICE AND METHOD FOR GENERATING VORTEX

BACKGROUND OF THE INVENTION

The present invention generally relates to a device used to generate a vortex. More particularly, the invention relates to a device for creating a clearly visible vortex within a fluidic phase and simulating a mini-tornado in appearance.

Devices are known for generating vortexes. For example, as is known, a water vortex may be created. It was found that although the water vortex can be seen under certain lighting conditions, whether colored dyes are used or not, in lower lighting conditions, such as when external lighting is removed and only the light generated by the device's LED's are present, the vortex is barely visible. In an attempt to render the vortex more highly visible, particularly in lower lighting conditions, additional research was conducted.

One difficulty involved finding a material that would provide a defined second phase to fill the vortex, making it more visible, without allowing its dispersion into the water. During initial experimentation, lighter-than-water solids were added and found to disperse into the water. Later, a combination of mineral oil and microspheres was tried in an attempt to bind the spheres to the oil and prevent dispersion. While this achieved some success, after several days it was found that the spheres tended to agglomerate. Many different types of microspheres were added to mineral oil during this time, including: plastic, glass and phenolics. Different size ranges, from tens of nanometers to hundreds of nanometers, were also tried. All of the microspheres tested suffered from agglomeration. Testing with dispersed solids was also attempted, but the dispersed solids were found to be incompatible with water, i.e., the dispersants were hydrophilic.

Ultimately, as described in more detail below, a dispersion of spherical polyethylene powder suspended in a silicone carrying fluid was found to be an ideal choice, performing a second fluid phase to fill the vortex. Benefits of such a two-phase system include that the vortex so-generated: has the appearance of a tornado; has a degree of opacity such that the vortex is readily visible under even low-level lighting conditions; and is believed to be more appealing to the eye than those generated in water-only, or in colored water.

Prior devices for creating a vortex have used a water pump for causing the water to swirl. However, it is feared that water pumps may suck the opacifying phase into the pump over time, potentially breaking up and dispersing this phase into the primary fluidic phase (e.g., water). Water pumps are also relatively noisy. Thus, while useable with the present invention, water pumps are not the preferred mechanism for rotating or swirling the secondary phase to create a vortex.

Accordingly, it would be advantageous to provide a device and method for generating a visible vortex, for use as an instructional device and/or for display and enjoyment purposes. Preferably, such a device would minimize moving parts and would consistently generate a visible vortex capable of possessing a substantial length relative to the tube housing the fluid. It would also be desirable to provide a colorful vortex display whose color can be changed as desired, and to utilize substances which are at least substantially non-toxic. It would also be advantageous to generate the vortex in a relatively quiet manner, and in a manner that allows long-term use of the secondary phase vortex, without its dispersion into the primary fluidic phase.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Hall effect sensor" means a sensing device which senses electrical potential generated on opposite sides of an electrical conductor through which an electric current is flowing, which is created a magnetic field.

"Stir bar" means a mechanical agitator capable of creating a swirling effect in a liquid for the purpose of generating a vortex.

"Vortex" means a mass of a secondary phase having a whirling or circular motion with an angular velocity that tends to fill a cavity in its center, generally approximating the look of a miniature tornado.

SUMMARY OF THE INVENTION

The objects mentioned above, as well as other objects, are solved by the present invention, which overcomes disadvantages of prior vortex-generating devices and methods, while providing new advantages not previously associated with such devices and methods.

In a preferred embodiment, a device is provided for generating a visible vortex for display or educational purposes. The device may include a container housing a two-phase fluidic system which may include a primary phase and a secondary phase which is not miscible in the primary phase. A mechanism is used to rotate or swirl the secondary phase to generate a visible vortex within the primary phase. The mechanism so used may be a fluidic pump or, more preferably, a rotating stir bar located in the container with a rotational speed sufficient to create the vortex. The container may be cylindrical or may have other shapes.

In a particularly preferred embodiment, the primary phase includes water, and the secondary phase includes a hydrophobic fluid, such as silicone fluid, carrying a powder such as spherically-shaped polyethylene particles. In the particularly preferred embodiment, the carrying fluid has a specific gravity of between about 0.86-0.90 g/cm$^3$, and the polyethylene powder particles have a size range of between about 300-400 microns. Most preferably, the viscosity of the silicone carrying fluid is about 2 centistokes.

Most preferably, the stir bar is a magnetic stir bar having a rotational speed in the range of about 600-800 revolutions per minute. A microprocessor may be used to communicate with a Hall effect sensor for controlling the rotational speed of the stir bar. Various light sources, such as LEDs, may be used to illuminate the container; the light reflects off of the polyethylene powder in the secondary phase, rendering the vortex highly visible in any desired color. The color and intensity of the LEDs, for example, may be controlled using an RGB controller.

Using the principles of the present invention, a highly visible, continuous and sustainable vortex may be created with a length which is a substantial percentage of the length of the container. While the length of the vortex may be adjusted to be aesthetically pleasing, in a particularly preferred embodiment a vortex length which was 80-90% of the container length was used.

A method for generating a visible vortex for display or educational purposes also forms a part of the present invention. In a preferred method, a container is provided for housing a two-phase fluidic system, including a primary phase and a secondary phase which is immiscible in the primary phase. The fluidic system may be stirred using a pump or a stir bar, such as a magnetic stir bar, having a rotational speed which is sufficient to create a vortex made of the secondary phase. The secondary phase may include silicone fluid and polyethylene powder as described above. The rotational speed of the stir bar may be controlled using a microprocessor communicating with a Hall effect sensor.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 1 is a perspective view of a preferred embodiment of the vortex-generating device of the present invention;

FIG. 2 is a disassembled parts view of the device shown in FIG. 1;

FIG. 3 is a disassembled parts view of the base of the device shown in FIG. 1;

Figure 4:
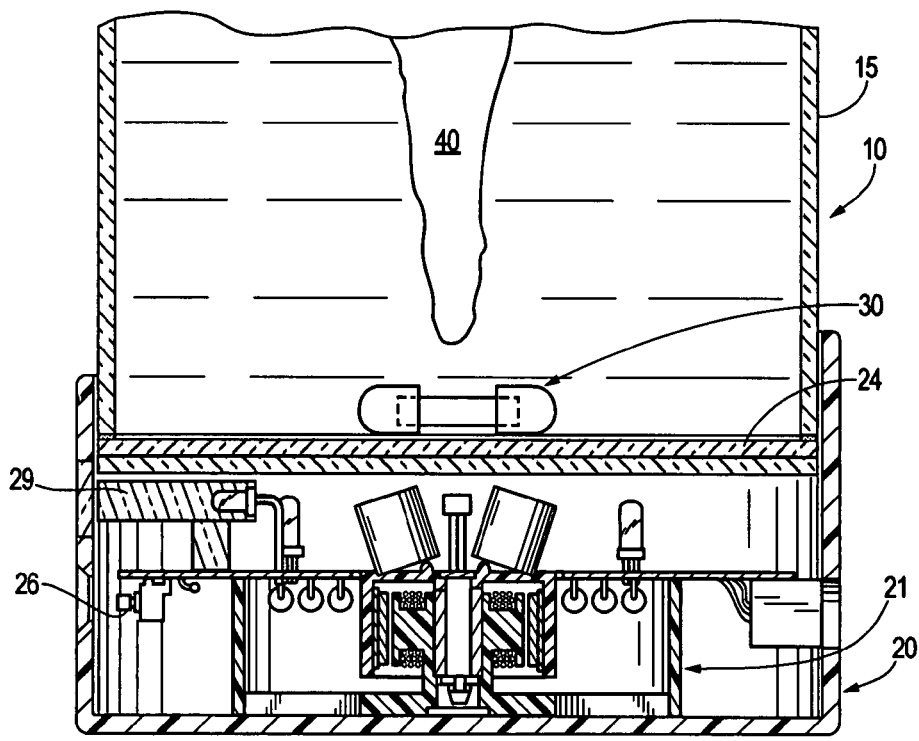
FIG. 4 is a partial, side cross-sectional view taken along reference line 4-4 of FIG. 1.
Figure 5:
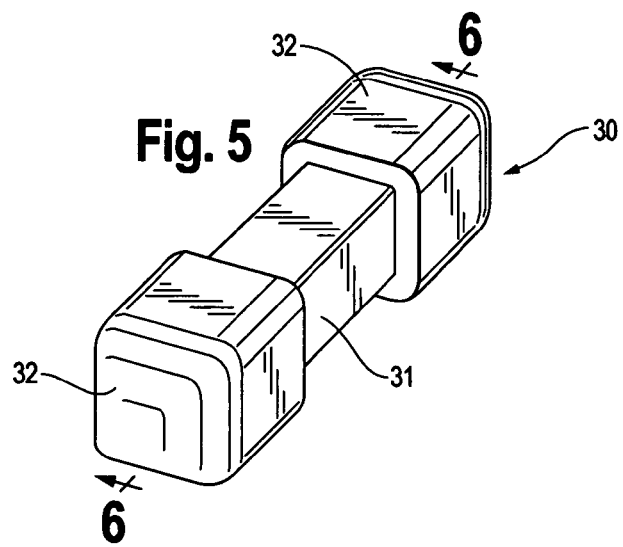
FIG. 5 is an enlarged perspective view of one embodiment of the stir bar.
Figure 6:
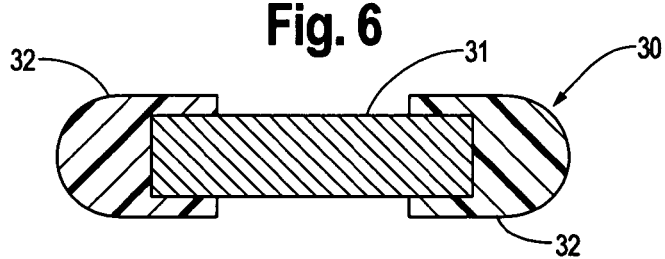
FIG. 6 is a side, cross-sectional view taken along reference lines 6-6 of FIG. 5.

The components in the drawings are not necessarily to scale, emphasis instead being placed upon clearly illustrating the principles of the present invention.

DETAILED DESCRIPTION OF THE PREFERRED EMBODIMENT

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Referring to the preferred embodiment of the vortex-generating device 10 shown in FIG. 1, device 10 includes a liquid container 15, and a base 20. Liquid container 15 may be in cylindrical form, may be made of glass or hard plastic, and includes a lid assembly 17, and a bottom 24 (shown in FIG. 2). Container 15 may also be made in a variety of other shapes such as, but not limited to, ovoid, spherical, rectangular, etc., provided that a vortex is capable of being formed within such a non-cylindrical container given the potential for formation of interfering eddy currents. Referring now to FIG. 2, top lid portion 17a may be held down over rubber seal 17b within base lid 17c using fasteners such as thumb screws inserted into apertures 19. Base 20 preferably houses a microcontroller 89, a motor 67 (shown in FIG. 3) within motor housing 67a, a power on/off button 26 located within housing 27 which is contained by aperture 28, and a light guide 29 as described below. A power connector may be located on base 20, opposite power button 26, for receiving an input wired to an AC wall or power adaptor, for example. A light spreader disc 65 (e.g., white acrylic) may be secured using screws (not shown) within base apertures 81 (shown in FIG. 3), and may be used to diffuse light from LEDs 66. For example, several LEDs such as 4 LEDs 66 may be arranged as shown in FIG. 3, while another LED 66 may be located to diffuse light through light guide 29 such as for lighting a logo (not shown). Component 69 may be used to retain light guide 29 in place relative to printed circuit board (PCB) 22, using fasteners 69a. The LEDs may be colorized to provide "mood" or other lighting conditions. Fasteners such as screws (not shown) may be inserted into apertures 23 to secure the base and disc 24 into cylinder 15. Seal 17b and glued disc 24 create a water-tight seal that allows device 10 to be moved without spilling the contents of cylinder 15.

Using device 10 of the preferred embodiment disclosed here, a vortex 40 may be created within cylinder 15. For this purpose, cylinder 15 may be filled with a two-phase system composed of a primary phase such as water (e.g., about 3.2 liters in a cylindrical container with a 119 mm ID) and a water insoluble, buoyant fluidic secondary phase. The secondary phase preferably includes a carrying fluid, and an opacifying agent such as polyethylene powder (e.g., about 11.00-11.40 grams of this agent, which may have a specific gravity between 0.92 and 0.94 g/cm$^3$). This polyethylene powder was found not to agglomerate and stayed within the secondary phase. The total fluid volume of the carrying fluid with the opacifying agent in the preferred embodiment was about 75 ml. (Of course, if the amount of the water or other primary phase fluid is changed, the amounts of carrying fluid and opacifying agent should also be proportionally changed.) A preferred carrying fluid was discovered to be silicone fluid, such as DOW Corning 200 fluid. A preferred opacifying agent was discovered to be polyethylene powder which is spherical in shape, and which is generally available from various manufacturers.

A particularly preferred carrying fluid useful with the present invention is extremely hydrophobic, such that it will not emulsify, dissolve or degrade in the primary phase (e.g., water), even after months or years of operation.

The secondary phase preferably has a low viscosity. A viscosity for the carrying fluid of about 2 centistokes was found to be an ideal viscosity for providing a pleasing vortex shape with minimal break-up of the vortex column.

The preferred opacifying agent provides a partially opaque appearance, which reflects light sufficiently to make the vortex visible, as a principal goal of the secondary phase is to create the appearance of a tornado. Preferred opacifying agents have a specific gravity less than water, a size range of about 300-400 microns, and will not dramatically increase the viscosity or density of the two-phase system. The preferred opacifying agent should also be hydrophobic and not have any attribute which would cause hydrophylicity in the second phase.

The vortex consisting of the secondary phase is created using the stir bar, as discussed below, thereby creating the appearance of a tornado which is clearly visible even in low ambient lighting conditions.

Vortex 40 is preferably created by stirring the two-phase fluidic system using a stir bar, such that the secondary phase forms the vortex. The preferred stir bar is composed of a magnet 31 with plastic caps 32 on the ends that create a unique shape that spins the water to create vortex 40 while simultaneously creating turbulence that prevent the vortex from being drawn into the stir bar, i.e., by preventing the two-phase system from touching the stir bar and breaking apart. Without this property, testing indicates that the secondary phase would be dispersed into the water, clouding it and disturbing the view of the vortex. Stir bar caps 32 also serve to protect the glass in the event that the stir bar is dropped into an empty cylinder 15.

One preferred stir bar 30 is made of a rare-earth neodymium-iron-boron magnet (NdFeB) and has the following dimensions: ¼" by ¼" by 1" with poles located on the ends, and two custom-made plastic (e.g., polyethylene) end caps 32. With the end caps, the total length of the stir bar is about 1.6" and its total height is about ⅜". The stir bar's length and height determine the width of the vortex and the amount of turbulence created by the stir bar. A larger stir bar, for example, will create a larger vortex but require a lower RPM while the converse is also true. The height of the stir bar also affects the amount of turbulence created and the volume of water turned.

Rotation of stir bar 30 may be driven by a PC fan. For example, stir bar 30 may be preferably magnetically coupled to a brushless DC motor 67 located in the center of base 20. Motor 67 preferably has two NdFeB magnets 62 (e.g., cylinders with a height of ¼" and a ½" diameter) mounted as shown in FIGS. 2 and 4 so that their poles attract the poles of the stir bar, for driving rotation of the stir bar.

The use of a stir bar with the present invention to create the swirling vortex is believed to have several advantages. Preferably, the motor used is a brushless motor having a quiet operation and possessing a relatively long expected operational life. Also, as opposed to a water pump which can suck the secondary phase creating the vortex into the pump over time, thus dispersing the secondary phase into the primary phase, the stir bar of the present invention preferably creates turbulence in the center of its rotation, which counters the downward pull of the vortex. The turbulence exerts an upward push on the vortex, keeping the vortex from actually touching the stir bar, thereby preventing dispersion of the vortex phase into the primary phase.

Motor speed may be regulated by the use of a Hall effect sensor 87 mounted on PCB 22, so that sensor 87 is located within the magnetic field of magnets 62 mounted to motor 67. (The Hall effect refers to the potential difference (Hall voltage) on the opposite sides of an electrical conductor through which an electric current is flowing created by a magnetic field applied perpendicular to the current. The ratio of the voltage created to the product of the amount of current and the magnetic field divided by the element thickness is known as the Hall coefficient.) Sensor 87 may use motor speed as a feedback signal to microprocessor 89 to accurately control the speed of motor 67.

An RPM of about 600-800, and more preferably about 730, for stir bar 30 was found efficacious to create a vortex 40 having a substantial length compared to the length of cylinder 15, such as 80%-90% of the cylinder length. Of course, the relative length of the vortex may be adjusted to be aesthetically pleasing.

Vortex 40 may be illuminated by RGB LEDs (e.g., a combination of red, green and blue LEDs whose intensity may be varied to create a variety of colors), which may be controlled by microprocessor 89 to create a multitude of colors and patterns of colors. A noise source 91 located on PCB 22 may be used to supply a random voltage to microprocessor 89, to create random sequences of colors and patterns (e.g., strobe and/or flashing patterns, etc.); alternatively, a pseudo-random noise generator such as one derived from software code may be used.

Button 26 on the side of base 20 allows the user to turn on/off device 10 and to select the various modes or patterns of colors that the device may be used to create.

Microprocessor 89 located on PCB 22 may be used to control the speed of motor 67, to monitor the button for switching modes and turning the unit on/off, and to produce the colors generated by the RGB LEDs by use of software loaded onto it.

Light guide 29 may be used to diffuse light and illuminate a logo (not shown) on base 20. An RGB LED mounted to light guide 29 may serve as the source of illumination and follow the same color and pattern as the other LEDs.

The vortex 40 created using the two-phase system described above, such that the vortex of secondary fluid floating within the primary fluid of a liquid such as water, has a sharp, easily discernible appearance, even in relatively low ambient light conditions.

The above description is not intended to limit the meaning of the words used in the following claims that define the invention. For example, while preferred embodiments have been described above, persons of ordinary skill in the art will understand that a variety of other designs still falling within the scope of the following claims may be envisioned and used. It is contemplated that future modifications in structure, function or result will exist that are not substantial changes and that all such insubstantial changes in what is claimed are intended to be covered by the claims.

I claim:

1. A device for generating a visible vortex having a lower terminus for display or educational purposes, the device comprising:

a substantially cylindrically shaped container having a lower end, an upper end, a diameter D and a longitudinal length L, the container housing a two-phase fluidic system comprising a first phase fluid and a second phase fluid;

the first phase fluid comprising water; the second phase fluid comprising silicone fluid and having a specific gravity of between about 0.86-0.90 g/cm$^3$;

the two-phase fluidic system further comprising an opacifying agent consisting essentially of polyethylene powder suspended in the silicone fluid, the powder having a specific gravity between 0.92 and 0.94 and a size range of between 300-400 microns;

a rotatable, magnetic stir bar positioned proximate to the lower end of the container and controlled to maintain a speed of rotation S sufficient to swirl the two-phase fluidic system such that the silicone fluid forms a vortex having a length of between 80% L and 90% L and being visible within the water;

the rotatable stir bar further being constructed and arranged so as to create sufficient turbulence while being rotated at the speed S such that the lower terminus of the vortex does not contact the stir bar; and the stir bar further being substantially elongated and having a length of about four times its width, and having end caps positioned over the ends of the stir bar to form a stir bar subassembly.

2. A device for generating a visible vortex having a lower terminus for display or educational purposes, the device comprising:

a substantially cylindrically shaped container having a lower end, an upper end, a diameter D and a longitudinal length L, the container housing a two-phase fluidic system comprising a first phase fluid and a second phase fluid;

the first phase fluid comprising water; the second phase fluid comprising silicone fluid and having a specific gravity of between about 0.86-0.90 g/cm$^3$;

the two-phase fluidic system further comprising an opacifying agent consisting essentially of polyethylene powder suspended in the silicone fluid, the powder having a specific gravity between 0.92 and 0.94 and a size range of between 300-400 microns;

a rotatable, magnetic stir bar positioned proximate to the lower end of the container and controlled to maintain a speed of rotation S sufficient to swirl the two-phase fluidic system such that the silicone fluid forms a vortex having a length of between 80% L and 90% L and being visible within the water;

the rotatable stir bar further being constructed and arranged so as to create sufficient turbulence while being rotated at the speed S such that the lower terminus of the vortex does not contact the stir bar;

the stir bar further being substantially elongated and having a length of about four times its width, and having end caps positioned over the ends of the stir bar to form a stir bar subassembly;

a microprocessor communicating with a Hall effect sensor for controlling the rotational speed of the stir bar;

an LED having a color and a brightness, the LED being positioned to illuminate the container; and an RGB controller constructed and arranged to control the color and brightness of the LED;

wherein the container has an internal diameter of about 119 mm and a volume of about 3.2 liters; the two-phase fluidic system containing about 11.00 to 11.40 grams of the powder suspended in an amount of silicone fluid sufficient to yield a combined volume of about 75 ml, the speed S being maintainable at a speed of about 600 to 800 rpm, the stir bar being constructed of a rare-earth neodymium-ir-boron magnet (NdFeB) and having a length of about 1 inch, a height of about ¼ inch, and the stir bar subassembly having a length of about 1.6 inches and a height of about ⅜ inch.

* * * * *